US010399702B2

(12) United States Patent
McGeer (10) Patent No.: US 10,399,702 B2
(45) Date of Patent: Sep. 3, 2019

(54) CAPTURE AND LAUNCH APPARATUS AND METHOD OF USING SAME FOR AUTOMATED LAUNCH, RETRIEVAL, AND SERVICING OF A HOVERING AIRCRAFT

(71) Applicant: Aerovel Corporation, Bingen, WA (US)

(72) Inventor: Brian T. McGeer, Underwood, WA (US)

(73) Assignee: Aerovel Corporation, Bingen, WA (US)

( * ) Notice: Subject to any disclaimer, the term of this patent is extended or adjusted under 35 U.S.C. 154(b) by 325 days.

(21) Appl. No.: 15/421,732

(22) Filed: Feb. 1, 2017

(65) Prior Publication Data

US 2018/0050823 A1 Feb. 22, 2018

Related U.S. Application Data

(60) Provisional application No. 62/308,557, filed on Mar. 15, 2016.

(51) Int. Cl.
*B64F 1/04* (2006.01)
*B64C 39/02* (2006.01)
*B64C 29/02* (2006.01)

(52) U.S. Cl.
CPC .............. *B64F 1/04* (2013.01); *B64C 39/024* (2013.01); *B64C 29/02* (2013.01); *B64C 2201/08* (2013.01); *B64C 2201/182* (2013.01)

(58) Field of Classification Search
CPC .......................... B64C 2201/182; B64C 39/024
See application file for complete search history.

(56) References Cited

U.S. PATENT DOCUMENTS 968,339 A 8/1910 Geraldson
1,144,505 A 6/1915 Steffan
(Continued)

FOREIGN PATENT DOCUMENTS

CA 781808 4/1968
CA 839101 4/1970
(Continued)

OTHER PUBLICATIONS

"Trapeze" Wikipedia, Aug. 4, 2006, available at http://en.wikipedia.org/w/index.php?title=Trapeze&oldid=67584367.
(Continued)

*Primary Examiner* — Christopher P Ellis
(74) *Attorney, Agent, or Firm* — Neal, Gerber & Eisenberg LLP (57) ABSTRACT

Automated launch and retrieval of a "tail-sitting" VTOL aircraft is accomplished by exploiting the natural stability of hover when restrained in tension by an upwind wing tip. For retrieval, a flexible rod is lifted into contact with the trailing edge of the upwind wing as the aircraft translates downwind overhead. Sliding between the rod and wing leads to interlocking of hooks at the rod end and wing tip, while the aircraft swings into a stable tethered hover downwind of the rod. The rod is then used to pull the aircraft upwind into a fixture for secure parking and servicing. After servicing, the aircraft lifts-off into tethered hover, and power margin for climb is assessed. If the aircraft is judged to have sufficient power safely to proceed, then the interlocking hooks are disengaged, leaving the aircraft to climb away in free flight.

10 Claims, 13 Drawing Sheets

(56) References Cited

U.S. PATENT DOCUMENTS

| | | | |
|---|---|---|---|
| 1,306,860 A | 6/1919 | Smith | |
| 1,383,595 A * | 7/1921 | Black | B64F 1/04 |
| | | | 244/110 F |
| 1,499,472 A | 7/1924 | Pratt | |
| 1,582,188 A | 4/1926 | Mummert | |
| 1,625,020 A | 4/1927 | Guillermo | |
| 1,686,298 A | 10/1928 | Uhl | |
| 1,716,670 A | 6/1929 | Sperry | |
| 1,731,091 A | 10/1929 | Clayton | |
| 1,748,663 A | 2/1930 | Tucker | |
| 1,836,010 A | 12/1931 | Audrain | |
| 1,848,828 A | 3/1932 | Griffin | |
| 1,912,723 A | 6/1933 | Perkins | |
| 2,286,381 A * | 6/1942 | Rubissow | B64F 1/04 |
| | | | 244/63 |
| 2,415,071 A | 2/1947 | Brie | |
| 2,435,197 A | 2/1948 | Brodie | |
| 2,440,574 A | 4/1948 | Cotton | |
| 2,448,209 A | 8/1948 | Boyer et al. | |
| 2,488,050 A | 11/1949 | Brodie | |
| 2,488,051 A | 11/1949 | Brodie | |
| 2,552,115 A | 5/1951 | Replogle | |
| 2,807,429 A | 9/1957 | Hawkins, Jr. et al. | |
| 2,843,337 A | 7/1958 | Bennett | |
| 2,944,815 A | 7/1960 | Moyer | |
| 3,017,138 A | 1/1962 | Flint | |
| 3,029,049 A | 4/1962 | Melville | |
| 3,146,974 A | 9/1964 | Petoia | |
| 3,351,325 A | 11/1967 | Cotton | |
| 3,389,880 A | 6/1968 | Ferguson | |
| 3,785,316 A | 1/1974 | Leming et al. | |
| 3,980,259 A | 9/1976 | Greenhalgh et al. | |
| 4,079,901 A | 3/1978 | Mayhew et al. | |
| 4,116,408 A | 9/1978 | Soloy | |
| 4,123,020 A | 10/1978 | Korsak | |
| 4,147,317 A | 4/1979 | Mayhew et al. | |
| 4,267,987 A | 5/1981 | McDonnell | |
| 4,311,290 A * | 1/1982 | Koper | B64F 1/02 |
| | | | 244/110 R |
| 4,523,729 A | 6/1985 | Frick | |
| 4,575,026 A | 3/1986 | Brittain et al. | |
| 4,680,962 A | 7/1987 | Durbin | |
| 4,753,400 A * | 6/1988 | Reuter | B64F 1/02 |
| | | | 244/110 R |
| 4,757,959 A | 7/1988 | Schroder et al. | |
| 4,790,497 A * | 12/1988 | Yoffe | B64F 1/02 |
| | | | 244/110 F |
| 4,842,222 A | 6/1989 | Baird | |
| 5,000,398 A | 3/1991 | Rashev | |
| 5,039,034 A | 8/1991 | Burgess et al. | |
| 5,042,750 A | 8/1991 | Winter | |
| 5,054,717 A | 10/1991 | Taylor | |
| 5,092,540 A | 3/1992 | Burgess et al. | |
| 5,687,930 A | 11/1997 | Wagner et al. | |
| 5,799,900 A | 9/1998 | McDonnell | |
| 5,806,795 A | 9/1998 | Ortelli | |
| 6,264,140 B1 | 7/2001 | McGeer et al. | |
| 6,824,102 B2 | 11/2004 | Haggard | |
| 6,874,729 B1 | 4/2005 | McDonnell | |
| 6,961,018 B2 | 11/2005 | Heppe et al. | |
| 7,028,947 B2 | 4/2006 | Burns | |
| 7,066,430 B2 | 6/2006 | Dennis et al. | |
| 7,097,137 B2 * | 8/2006 | McDonnell | B64C 25/68 |
| | | | 244/110 C |
| 7,104,495 B2 | 9/2006 | McGeer | |
| 7,121,507 B2 | 10/2006 | Dennis et al. | |
| 7,140,575 B2 | 11/2006 | McGeer et al. | |
| 7,143,974 B2 * | 12/2006 | Roeseler | B64C 39/024 |
| | | | 244/63 |
| 7,143,976 B2 | 12/2006 | Snediker et al. | |
| 7,152,827 B2 | 12/2006 | McGeer | |
| 7,165,745 B2 | 1/2007 | McGeer et al. | |
| 7,175,135 B2 | 2/2007 | Dennis et al. | |
| 7,219,856 B2 * | 5/2007 | Watts | B64F 1/02 |
| | | | 244/110 F |
| 7,264,204 B1 | 9/2007 | Portmann | |
| 7,344,108 B2 | 3/2008 | Muylaert et al. | |
| 7,360,741 B2 | 4/2008 | McGeer et al. | |
| 7,410,125 B2 | 8/2008 | Steele | |
| 7,464,650 B2 | 12/2008 | Steinkerchner et al. | |
| 7,510,145 B2 | 3/2009 | Snediker | |
| 7,530,527 B2 | 5/2009 | Kelleher | |
| 7,543,780 B1 | 6/2009 | Marshall et al. | |
| 7,562,843 B2 | 7/2009 | Lipponen | |
| 7,665,691 B2 | 2/2010 | Hanzlick et al. | |
| 7,712,702 B2 | 5/2010 | McGeer et al. | |
| 7,954,758 B2 * | 6/2011 | McGeer | B64C 39/024 |
| | | | 244/110 C |
| 8,162,256 B2 | 4/2012 | Goossen | |
| 8,172,177 B2 | 5/2012 | Lovell | |
| 8,231,083 B2 | 7/2012 | Kutzmann et al. | |
| 8,245,968 B2 | 8/2012 | McGeer et al. | |
| 8,276,844 B2 | 10/2012 | Kariv | |
| 8,292,215 B2 | 10/2012 | Olm et al. | |
| 8,313,057 B2 | 11/2012 | Rednikov | |
| 8,348,193 B2 | 1/2013 | McGeer et al. | |
| 8,453,966 B2 * | 6/2013 | McGeer | B64C 25/68 |
| | | | 244/110 C |
| 8,464,981 B2 | 6/2013 | Goldie et al. | |
| 8,573,536 B2 * | 11/2013 | McGeer | B64C 39/024 |
| | | | 244/110 C |
| 8,596,576 B1 | 12/2013 | McGeer et al. | |
| 8,672,264 B1 | 3/2014 | McGeer et al. | |
| 8,708,277 B1 | 4/2014 | McGeer et al. | |
| 8,708,278 B2 | 4/2014 | McGeer et al. | |
| 8,714,482 B2 | 5/2014 | McGeer et al. | |
| 8,740,134 B2 | 6/2014 | Suzuki | |
| 8,740,142 B2 | 6/2014 | McGeer et al. | |
| 8,944,373 B2 | 2/2015 | Dickson | |
| 8,950,698 B1 | 2/2015 | Rossi | |
| 8,955,800 B2 * | 2/2015 | McGeer | B64F 1/02 |
| | | | 244/110 E |
| 8,955,801 B2 | 2/2015 | McGeer et al. | |
| 9,004,402 B2 | 4/2015 | McGeer et al. | |
| 9,010,683 B2 | 4/2015 | Gundlach et al. | |
| 9,193,481 B2 | 11/2015 | McGeer et al. | |
| 9,290,269 B2 | 3/2016 | Walker et al. | |
| 9,434,481 B2 * | 9/2016 | McGeer | B64F 1/02 |
| 9,656,765 B2 * | 5/2017 | von Flotow | B64D 5/00 |
| 2002/0100838 A1 * | 8/2002 | McGeer | B64C 25/68 |
| | | | 244/116 |
| 2003/0222173 A1 | 12/2003 | McGeer et al. | |
| 2004/0256519 A1 | 12/2004 | Ellis et al. | |
| 2005/0133665 A1 * | 6/2005 | Dennis | B64C 25/68 |
| | | | 244/110 E |
| 2005/0230536 A1 * | 10/2005 | Dennis | B64C 39/024 |
| | | | 244/110 C |
| 2006/0249623 A1 * | 11/2006 | Steele | B64F 1/02 |
| | | | 244/116 |
| 2009/0224097 A1 * | 9/2009 | Kariv | B64F 1/02 |
| | | | 244/63 |
| 2012/0223182 A1 | 9/2012 | Gilchrist, et al. | |
| 2013/0082137 A1 * | 4/2013 | Gundlach | B64C 25/68 |
| | | | 244/110 C |
| 2013/0320138 A1 * | 12/2013 | Dickson | B64F 1/02 |
| | | | 244/110 F |
| 2015/0129716 A1 | 5/2015 | Yoffe | |
| 2015/0314871 A1 | 11/2015 | von Flotow | |
| 2016/0114906 A1 | 4/2016 | McGeer et al. | |
| 2016/0152339 A1 * | 6/2016 | von Flotow | B64D 5/00 |
| | | | 244/2 |
| 2016/0327945 A1 | 11/2016 | Davidson | |
| 2017/0158340 A1 * | 6/2017 | von Flotow | B64C 39/024 |
| 2017/0253350 A1 * | 9/2017 | von Flotow | B64D 5/00 |
| 2018/0050823 A1 * | 2/2018 | McGeer | B64F 1/04 |

(56) References Cited

U.S. PATENT DOCUMENTS

| | | | | |
|---|---|---|---|---|
| 2018/0079530 A1* | 3/2018 | Wyrobek | ............... | B64C 39/024 |
| 2018/0086481 A1* | 3/2018 | Briggs | ................. | B64C 39/024 |

FOREIGN PATENT DOCUMENTS

| | | |
|---|---|---|
| CN | 204822072 | 12/2015 |
| EP | 0 472 613 | 4/1992 |
| EP | 2 186 728 | 5/2010 |
| GB | 2 071 031 | 9/1981 |
| WO | WO 01/07318 | 2/2001 |
| WO | WO 2008/015663 | 2/2008 |
| WO | WO 2013/171735 | 11/2013 |
| WO | WO 2014/204550 | 12/2014 |
| WO | WO 2016/167849 | 10/2016 |

OTHER PUBLICATIONS

A miniature powerplant for very small, very long range autonomous aircraft, S.P. Hendrickson and T. McGeer, Final Report under U.S. DoE contract No. DE-FG03-96ER82187, Sep. 1999, (25 pp.).

Aerosonde hazard estimation, T. McGeer, 1994, (6 pp.).

Aerosonde Pacific reconnaissance: ready when you are!, T. McGeer, Pacific Northwest Weather Workshop, Mar. 2005, (15 pp.).

An Airspeed Vector Sensor for V/STOL Aircraft, E. J. Durbin and T. McGeer, Journal of Aircraft, vol. 19 No. 6, Jun. 1982, (7 pp.).

Automated Launch, Recovery, and Refueling for Small Unmanned Aerial Vehicles, K. Mullens et al., 2004 (11 pp.).

Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp.).

Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).

Laima: The First Atlantic Crossing by Unmanned Aircraft, T. McGeer, Feb. 1999, (25 pp.).

Mini-RPV Recovery System Conceptual Study, Prepared for Eustis Directorate U.S. Army Air Mobility Research and Development Laboratory, Aug. 1977 (322 pages).

Quantitative Risk Management as a Regulatory Approach to Civil UAVs, T. McGeer, L. Newcombe, and J. Vagners, International Workshop on UAV Certification, Jun. 1999, (11 pp.).

Regulatory Issues Involving Long-Range Weather Observation by Aerosonde Autonomous Aircraft, T. McGeer, Oct. 1998, (8 pp.).

Rotary Action, description of scene of License to Kill, available at http://www.rotaryaction.com/pages/licetkil.html (2 pp.).

Safety, Economy, Reliability and Regulatory Policy of Unmanned Aircraft, T. McGeer, Mar. 2007, (9 pp.).

Skyhook (Harrier handling system); Harpoon Head Quarters; available at http://www.harpoondatabases.com/encyclopedia/Entry2979.aspx; printed Jun. 21, 2013 (3 pages).

The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp.).

Wide-Scale Use of Long-Range Miniature Aerosondes Over the World's Oceans, T. McGeer and J. Vagners, 1999, (25 pp.).

* cited by examiner

CAPTURE AND LAUNCH APPARATUS AND METHOD OF USING SAME FOR AUTOMATED LAUNCH, RETRIEVAL, AND SERVICING OF A HOVERING AIRCRAFT

PRIORITY CLAIM

This patent application claims priority to and the benefit of U.S. Provisional Patent Application No. 62/308,557, which was filed on Mar. 15, 2016, the entire contents of which are incorporated herein by reference.

FIELD

The present disclosure generally relates to launch, retrieval, and servicing of a hovering aircraft, especially in turbulent wind or onto an irregularly-moving platform, such as a ship in a rough sea.

BACKGROUND

Hovering aircraft, be they helicopters, thrust-vectoring jets, "tail-sitters," or other types, usually land by gently descending in free thrust-borne flight onto a landing surface, coming to rest on an undercarriage of wheels, skids, or legs. This elementary technique can be problematic in certain situations, as for example when targeting a small, windswept landing pad on a ship moving in a rough sea. Helicopters use the well-known Beartrap or RAST (Stewart & Baekken 1968) or the harpoon-and-grid system (Wolters & Reimering 1994) to enable retrieval with acceptable safety in such conditions. These systems require an expensive and substantial plant in the landing area, as well as manual operations coordinated between helicopter and shipboard crew. Furthermore, the helicopter must carry a complete undercarriage in addition to the components necessary for capturing the retrieval apparatus.

Desirable improvements relative to such systems include: (1) simplification of base and onboard apparatus, and (2) automated rather than manual operation. Ideally, automation encompasses not only retrieval but also subsequent servicing and launch. This is particularly desirable for an unmanned aircraft, whose operations cycle can then be made fully autonomous.

DETAILED DESCRIPTION

The present disclosure provides a capture and launch apparatus and a method of use for automated launch, retrieval, and servicing of a hovering aircraft. Specifically, the capture and launch apparatus of the present disclosure is used to retrieve a "tail-sitting" aircraft from free thrust-borne flight, to service the aircraft after capture, and to re-launch the aircraft into free thrust-borne flight.

The capture and launch apparatus and method of the present disclosure are especially suited to unmanned aircraft of small size. Certain embodiments enable a fully automated operations cycle, whereby the aircraft can be repeatedly launched, retrieved, serviced, and re-launched, without manual intervention at any point. In other embodiments, certain steps in the operations cycle can be manually performed. The invention calls for only modest accuracy in piloting, and offers greater simplicity than has previously been achieved, together with robustness in rougher conditions.

As shown in FIGS. 1A to 1F and 2A to 2G, an example tail-sitting aircraft 10 includes: (1) a generally cylindrical fuselage 100 having a front end and a rear end; (2) a main rotor 130 rotatably attached to the fuselage 100 near its front end that controls pitch and yaw of the aircraft 10 with rotor cyclic as in a conventional helicopter; (3) a right wing 110 extending from the fuselage 100; (4) a left wing 120 extending from the fuselage 100 symmetrically with respect to the first wing 110; (5) roll thrusters 115 and 125 attached to the respective wing tips that control roll of the aircraft 10; and (6) a capture device 127 attached to the trailing edge of the left wing 120 (as viewed in FIG. 1A) near the wing tip.

This is merely one example aircraft, and the capture and launch apparatus of the present disclosure may be used to capture, service, and re-launch any suitable aircraft.

1. First Example Embodiment

FIGS. 1A to 1F illustrate one example embodiment of the capture and launch apparatus of the present disclosure, generally indicated by element number 200. The capture and launch apparatus 200 includes: (1) a base 210; (2) a support 215; (3) a translation arm 220; (4) a capture-rod manipulator 230; (5) a capture rod 240 having a capture device 247 at its free end; (6) a wing restrainer 250 including first and second arms 251 and 253; and (7) a fuselage capturer 260 including first and second arms 261 and 263.

Figure 1A:
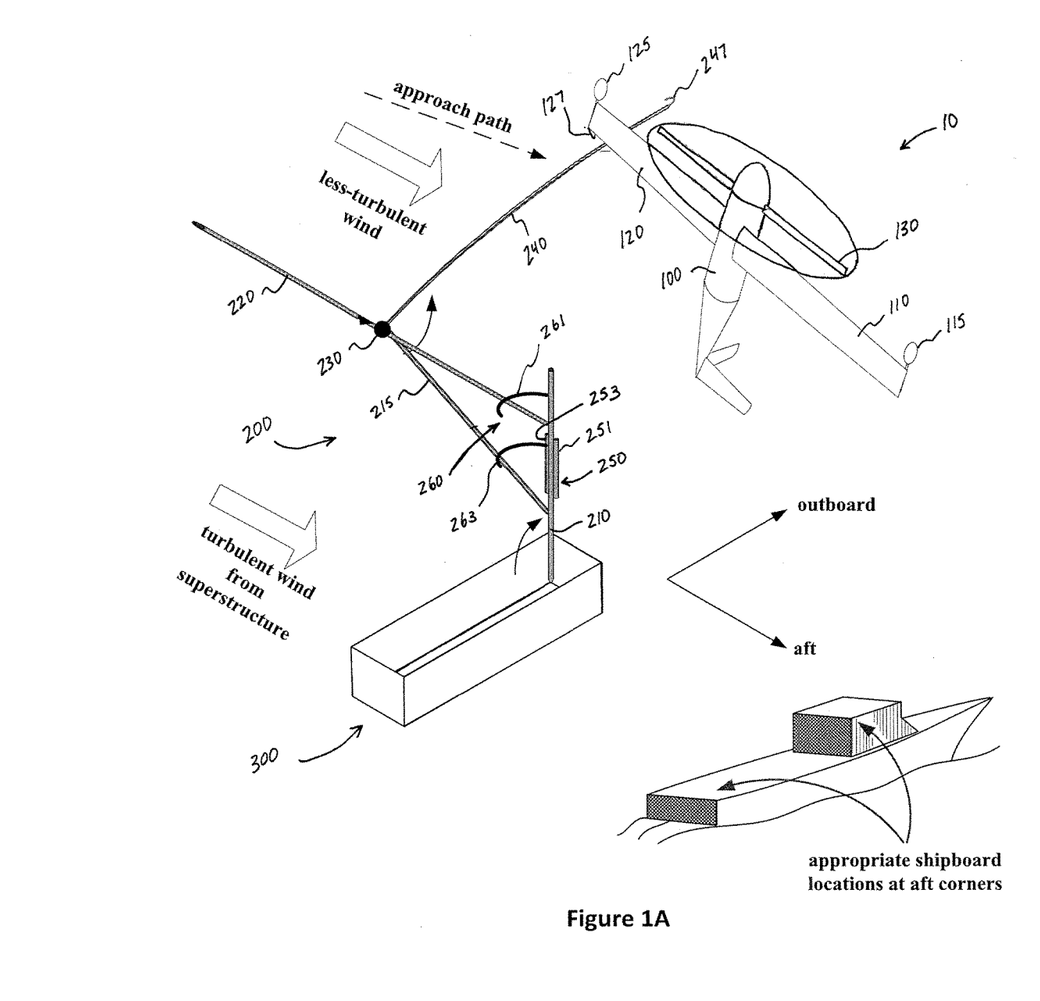
FIG. 1A shows a "tail-sitter" aircraft approaching an example embodiment of the capture and launch apparatus of the present disclosure in free thrust-borne flight, with a capture rod being elevated as the aircraft crosses overhead such that the capture rod contacts the trailing edge of the wing.

In this example embodiment, the base 210 includes a rigid post. A bottom of the base 210 is pivotably connected to the interior of a storage box 300 in which the capture and launch apparatus 200 can be stored along with the dismantled aircraft 10. The base 210 is pivotable between a stored position (not shown) within the storage box 300 and a deployed position shown in FIGS. 1A to 1F. The base may be attached to any suitable anchoring element, such as the deck of a ship at example locations as shown in FIG. 1A, the bed of a truck, or the ground.

The rigid translation arm 220 is attached at one end to the base 210 and extends generally in the direction from which the aircraft 10 approaches the capture and launch apparatus 200. In this embodiment it is braced by a support 215. In certain embodiments, the translation arm is rotatable in azimuth about the longitudinal axis of the base 210. This enables manual, machine-assisted, or automatic alignment with the desired approach path of the aircraft.

The capture rod 240 is flexible in bending and is fixedly connected to the capture-rod manipulator 230 such that the capture-rod manipulator 230 can rotate the capture rod 240: (1) in azimuth about a generally vertical axis passing through the capture-rod manipulator 230; and (2) in elevation relative to a generally horizontal plane. The capture rod manipulator 230 may include any suitable device, such as a pan/tilt servo or any other suitable altazimuth mount, to enable this functionality.

The capture-rod manipulator 230 is operatively coupled to a mover (not shown) that is integrated with, coupled to, or otherwise mounted to the translation arm 220. This operable coupling enables the mover to move the capture rod manipulator 230 along the translation arm 220 relative to the base 210. The mover may be any suitable component or combination of components, such as a rack-and-pinion, a cable-and-pulley arrangement, a lead screw, or an actuator.

The wing restrainer 250 (including, in this example embodiment, the first and second arms 251 and 253) is movable relative to the base 210 from a retracted position (shown in FIG. 1A) to an open position (shown in FIG. 1B) and finally to a closed position (shown in FIGS. 1C to 1F) (and vice-versa).

The fuselage capturer 260 (including, in this example embodiment, the first and second arms 261 and 263) is movable from an open position (shown in FIGS. 1A to 1C, 1E, and 1F) to a closed position (shown in FIG. 1D) (and vice-versa).

In operation of this example embodiment, the aircraft 10 proceeds automatically from free thrust-borne flight through retrieval, servicing, and subsequent launch via the following sequence of actions illustrated in FIGS. 1A to 1F.

FIG. 1A shows the aircraft 10 approaching the capture and launch apparatus 200. In preparation for retrieval, the capture rod 240 is positioned in a plane approximately normal to the approach path of the aircraft 10, at low elevation so that it remains below the aircraft 10 passing overhead. The aircraft 10 approaches with wings 110 and 120 generally parallel to the approach path, this path normally being downwind. Should the approach become unsatisfactory at any point, the aircraft 10 can climb away for another retrieval attempt without fouling the capture and launch apparatus 200. After the fuselage 100 passes over the capture rod 240, the capture-rod manipulator 230 elevates the capture rod 240 into contact with the trailing edge of the wing 120.

Figure 1B:
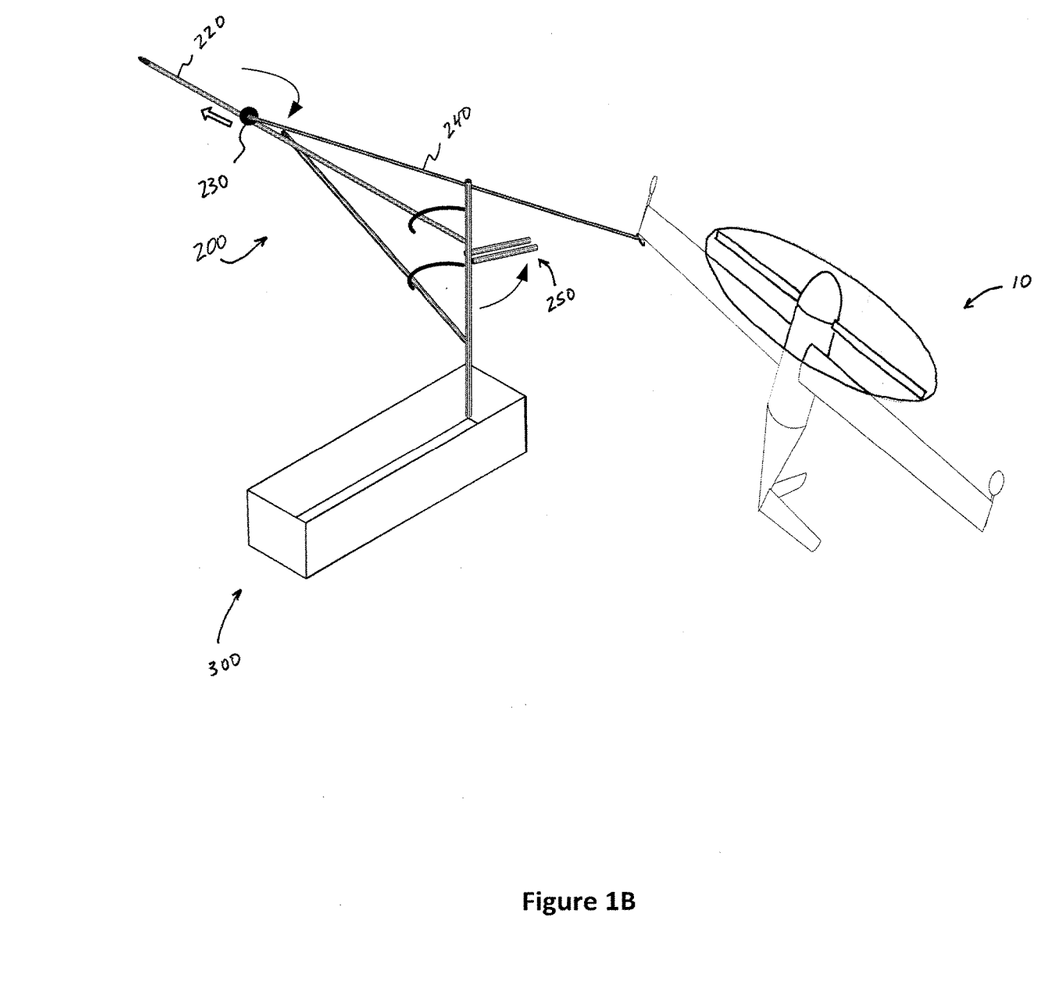
FIG. 1B shows the capture and launch apparatus of FIG. 1A after a wingtip capture device on the aircraft engages the capture rod, and the aircraft swings into a stable hover with the capture rod and wing in tension. The capture rod then draws the aircraft toward the capture and launch apparatus.

As shown in FIG. 1B, continued translation of the aircraft 10 relative to the capture and launch apparatus 200 guides the capture rod 240 along the trailing edge of the wing 120 into the wingtip capture device 127. The capture rod 240 then slides through the capture device 127 until the capture device 247 (e.g., a hook or cleat) engages the capture device 127 (e.g., a hook or cleat). The aircraft 10 is then effectively tethered to the capture and launch apparatus 200 by the aircraft's wing tip. The capture rod 240 is meanwhile allowed to swing freely in azimuth and elevation about the capture rod manipulator 230, while the aircraft 10 thrusts upward and away along a line approximately parallel to the approach path. The aircraft 10 thereby is naturally stable about a position in which the capture rod 240 and the wings 110 and 120 lie in approximately the same vertical plane, with the mass-center of the aircraft 10 being approximately collinear with the capture rod 240. The mover begins moving the capture rod manipulator 230 along the translation arm 220 so that the aircraft 10 is pulled toward the base 210. The wing restrainer 250 is meanwhile opened so that the capture rod 240 cannot be rotated to a low elevation.

Figure 1C:
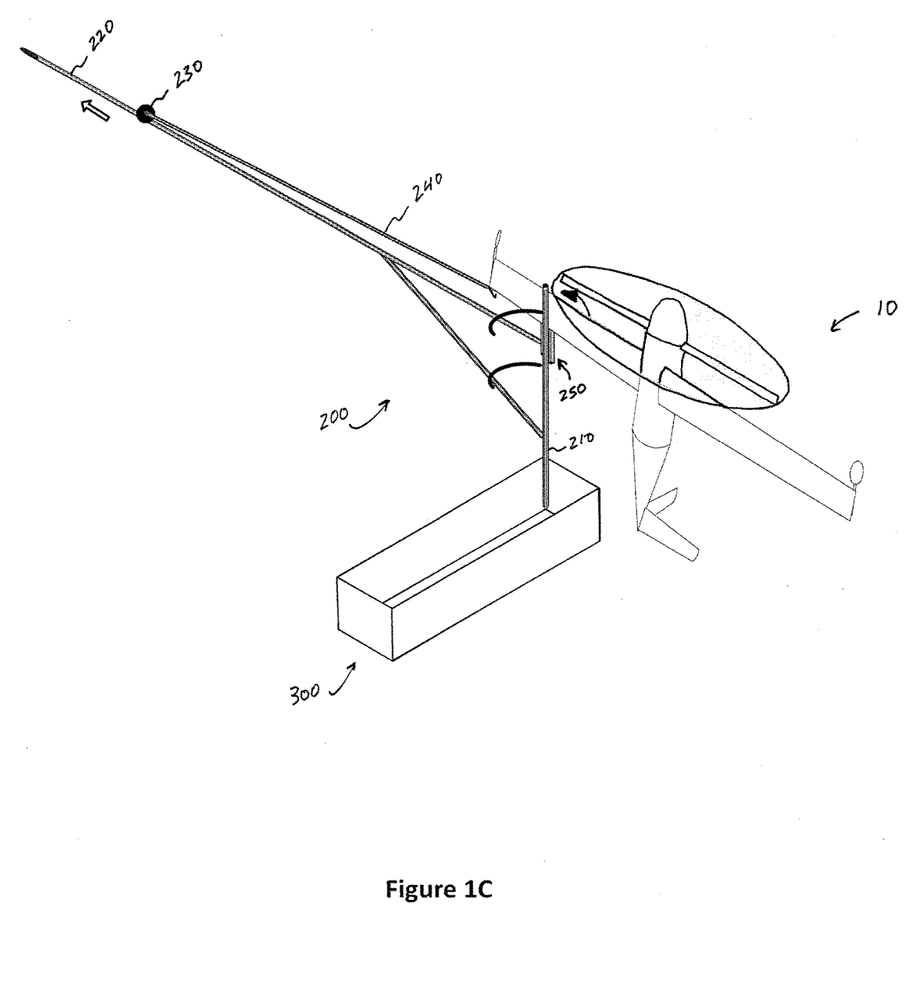
FIG. 1C shows the capture and launch apparatus of FIGS. 1A and 1B after a wing restrainer of the capture and launch apparatus is moved to constrain the aircraft in pitch and translation.
Figure 1D:
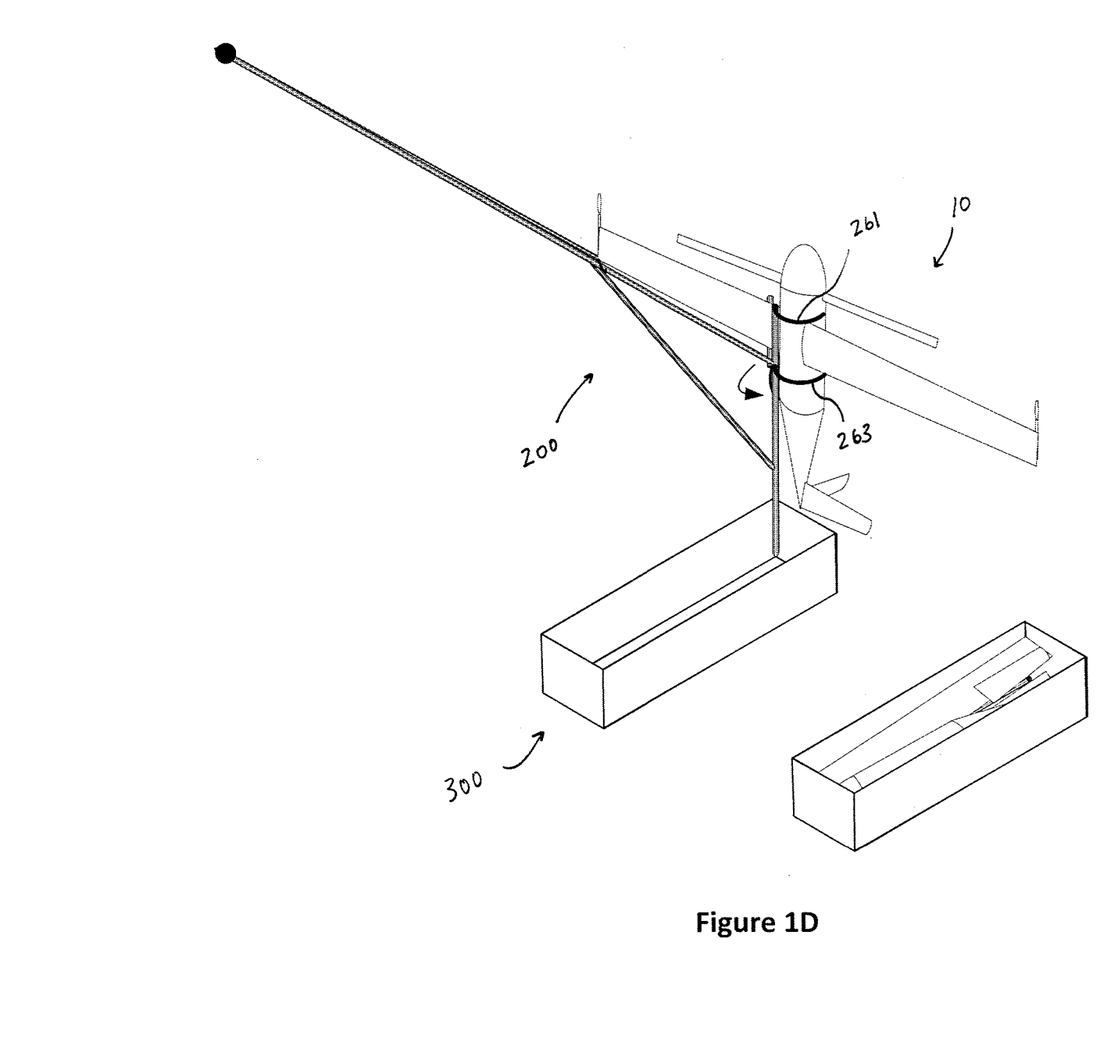
FIG. 1D shows the capture and launch apparatus of FIGS. 1A to 1C after a fuselage capturer has captured a fuselage of the aircraft for secure parking and servicing. After parking, the aircraft and the capture and launch apparatus could be dismantled and stored in a handling box, as shown.

When the wing 120 is pulled sufficiently along the translation arm 220 and reaches a wing capture position relative to the base 210, as shown in FIG. 1C, the wing restrainer 250 closes to constrain the wing 120 against the base 210. The aircraft 10 meanwhile continues to regulate its altitude relative to the capture and launch apparatus 200. The mover continues moving the capture rod manipulator 230 along the translation arm 220 to pull the aircraft 10 to a fuselage capture position, at which point the fuselage capturer 260 can close to secure the fuselage 100 is its parking position, as shown in FIG. 1D. The aircraft 10 can then be shut down, and suitable connections can (manually or automatically) be made for fuel, electrical power, or other services. If desired, the aircraft 10 along with the capture and launch apparatus 200 may be dismantled and boxed for storage in the box 300.

Figure 1E:
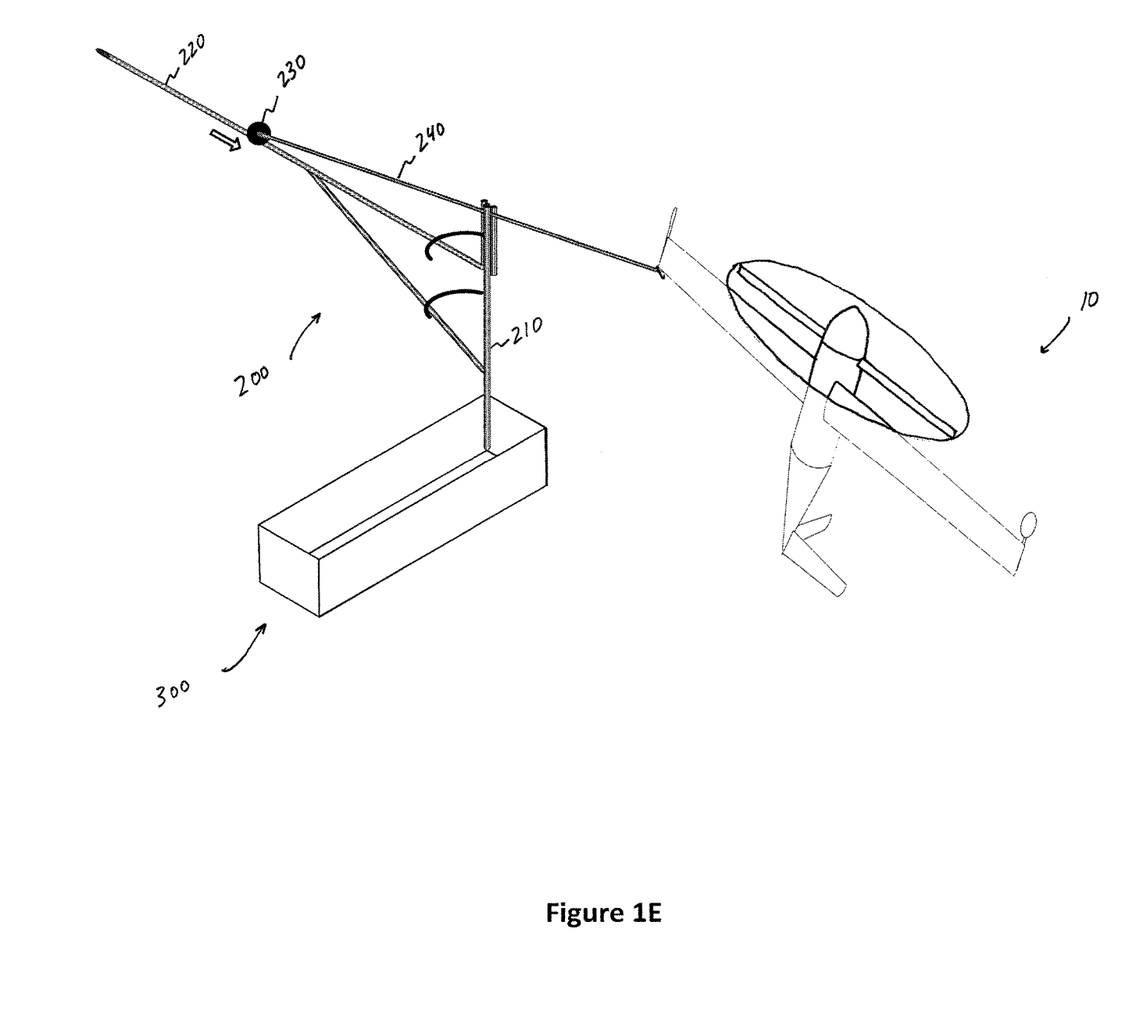
FIG. 1E shows the capture and launch apparatus of FIGS. 1A to 1D after the wing restrainer and the fuselage capturer are opened during launch, enabling the aircraft to liftoff into stable hover tethered by the capture rod.
Figure 1F:
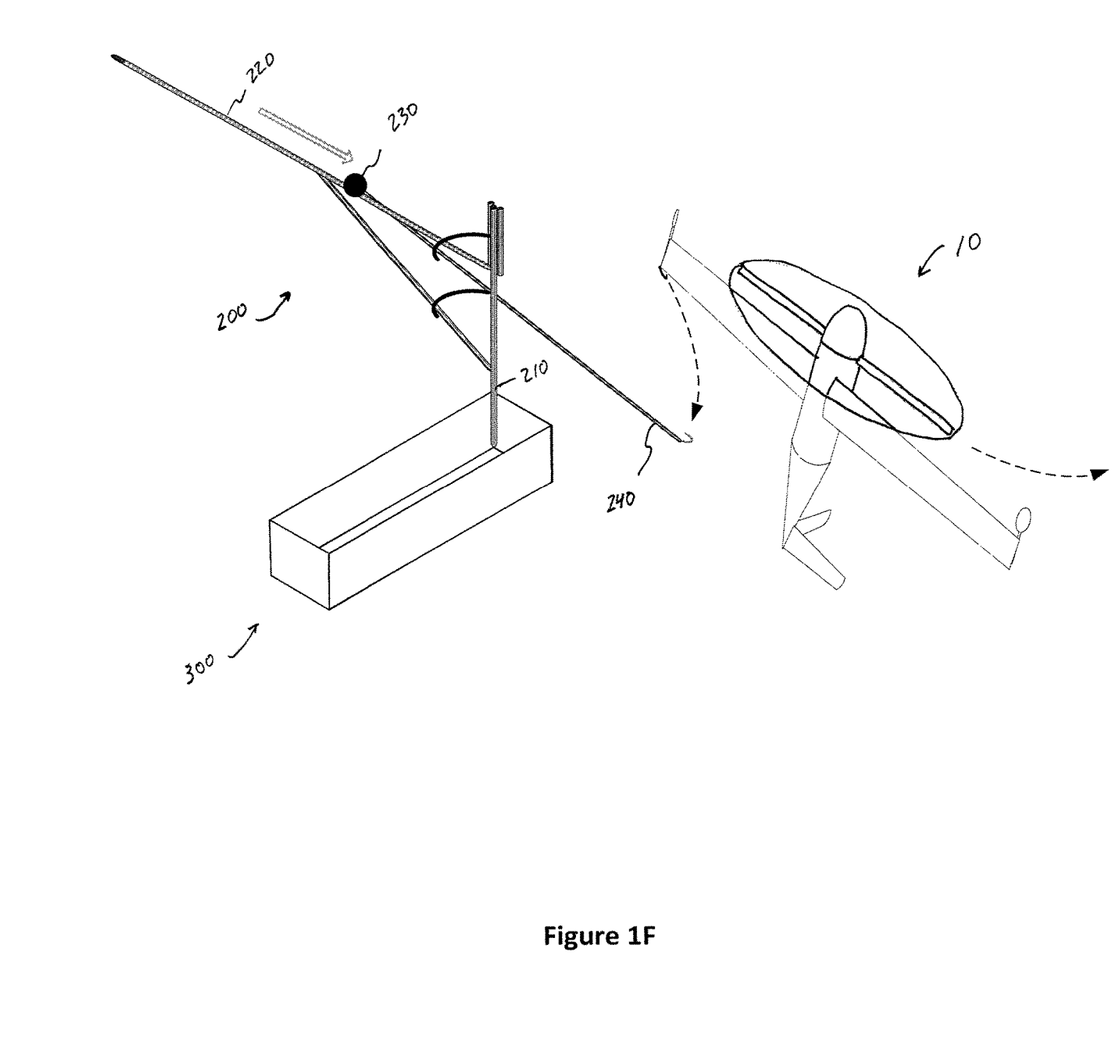
FIG. 1F shows the capture and launch apparatus of FIGS. 1A to 1E releasing the aircraft into free flight.

After servicing, launch is commenced by starting the engine of the aircraft 10. The fuselage capturer 260 and the wing restrainer 250 then open, and the aircraft 10 uses rotor thrust to lift away from the capture and launch apparatus 200 while keeping the capture rod 240 in tension. Normally this entails tilting rotor thrust in a downwind direction. The mover begins slowly moving the capture rod manipulator 230 along the translation arm 220 to belay the aircraft 10 downwind while the aircraft 10 regulates its attitude and altitude (as during retrieval). The aircraft 10 thus maintains a naturally stable position as shown in FIG. 1E. Engine power required for tethered hover can then be observed for a period sufficient to infer climb rate achievable in free flight. If the estimated rate is unsatisfactory, then the aircraft 10 can be re-captured; otherwise, the aircraft 10 can be released. As shown in FIG. 1F, this can be done by rapidly moving the capture rod 240 toward the aircraft 10 along the translation arm 220 (e.g., with spring-loading), thus pushing the rod-end capture device 247 out of the wingtip capture device 127. The capture rod 240 can then be lowered or swung clear of the aircraft 10.

Upon release, the aircraft 10 translates rapidly away from the capture and launch apparatus 200. This motion can be recognized promptly, at which point the aircraft 10 switches to free-flight control. It can then proceed on its mission, and ultimately return to the capture and launch apparatus 200 for another retrieval. The full operations cycle of the aircraft 10 can thus be performed without manual intervention.

2. Second Example Embodiment

FIGS. 2A to 2G illustrate another example embodiment of the capture and launch apparatus of the present disclosure, generally indicated by element number 1200. The capture and launch apparatus 1200 includes certain elements similar or identical to those included in the first example embodiment of the capture and launch apparatus 200 described above, including: (1) a base 1210; (2) a support 1215; (3) a translation arm 1220; (4) a capture-rod manipulator 1230; and (5) a capture rod 1240 having a rod-end capture device 1247 at one end. This example capture and launch apparatus 1200 differs from the first example embodiment of the capture and launch apparatus 200 in that it includes: (6) a wing restrainer 1250 including an arm 1251 and first and second fingers 1253 and 1255 (as opposed to the wing restrainer 250); and (7) a fairlead 1260.

Figure 2A:
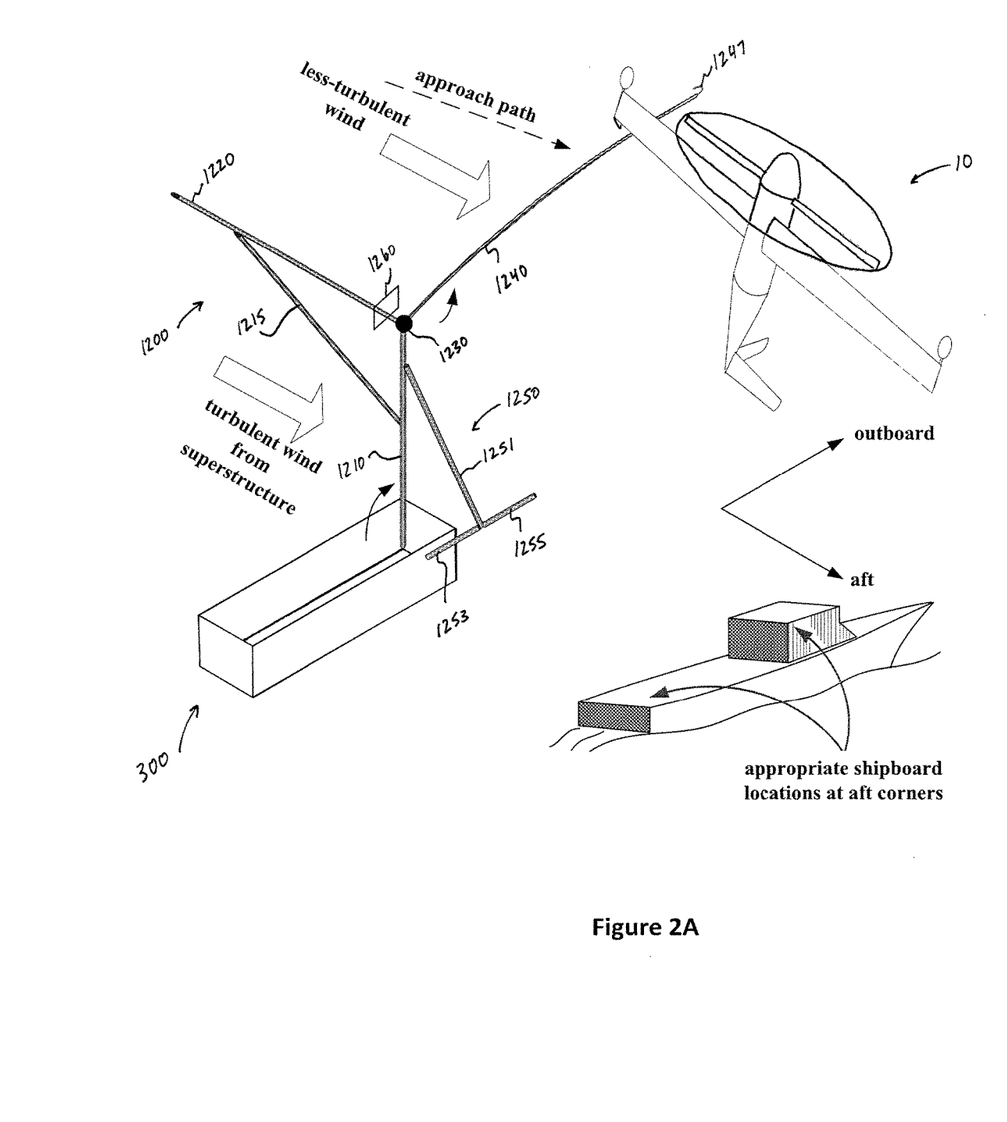
FIG. 2A shows an aircraft approaching another example embodiment of the capture and launch apparatus of the present disclosure with the capture rod having been elevated against the trailing edge of the aircraft's upwind wing as the aircraft passes overhead in free thrust-borne flight.
Figure 2B:
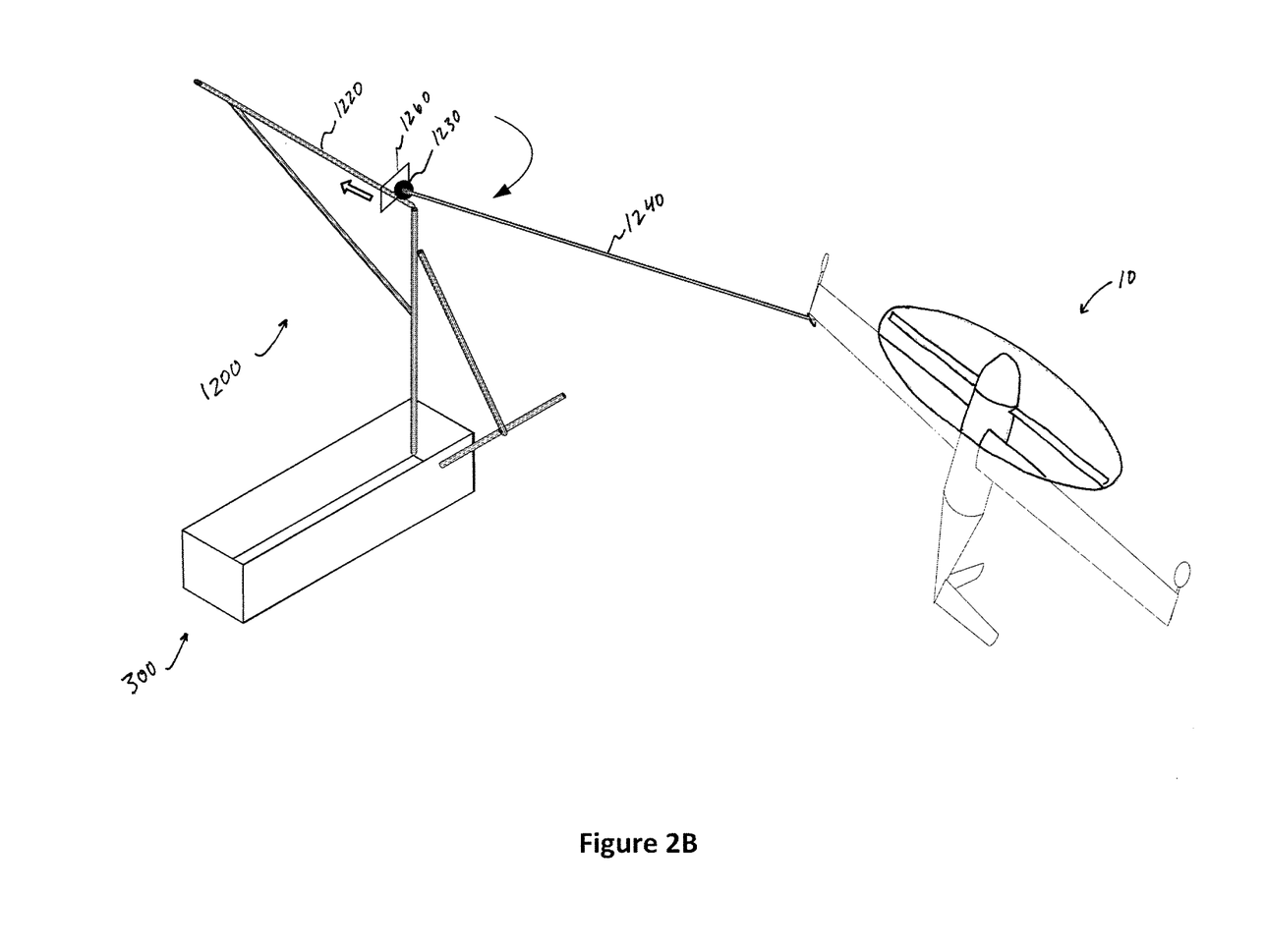
FIG. 2B shows the capture and launch apparatus of FIG. 2A after the aircraft has swung to the stable hover position, with the capture rod attached to the trailing wing tip.
Figure 2C:
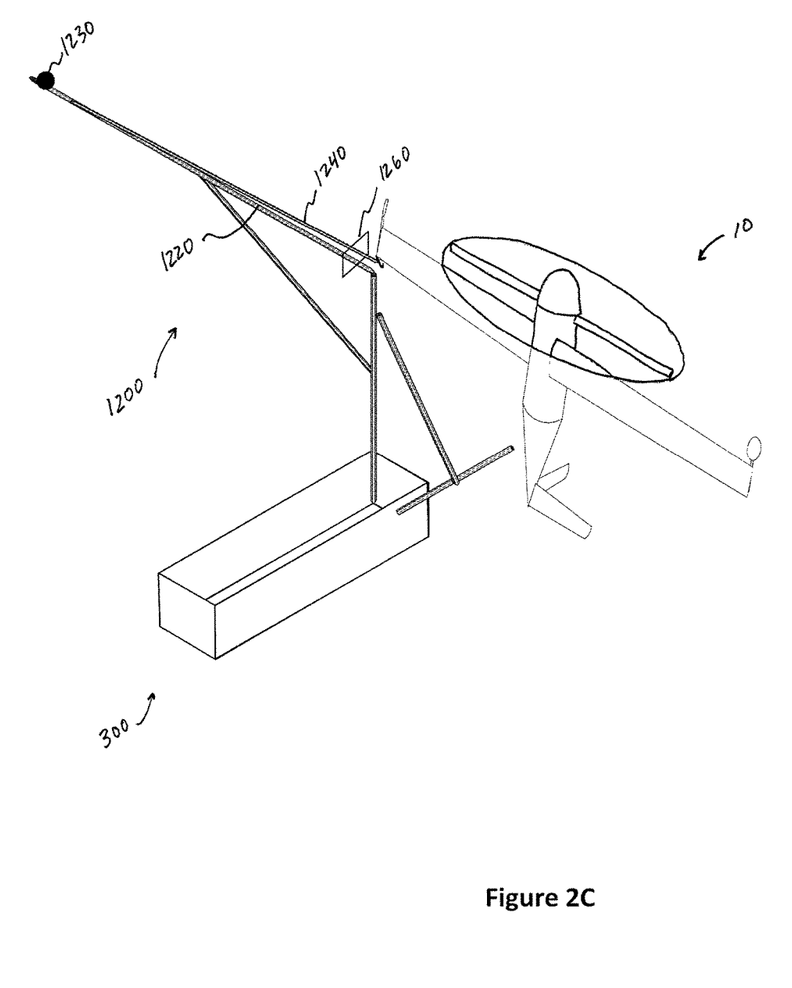
FIGS. 2C to 2E show the capture and launch apparatus of FIGS. 2A and 2B after the tethered wing has been pulled into position for a wing restrainer to engage the wing root, then with the wing restrainer engaging the wing-root, and finally with wing restrainer securely clamping the aircraft for servicing.
Figure 2D:
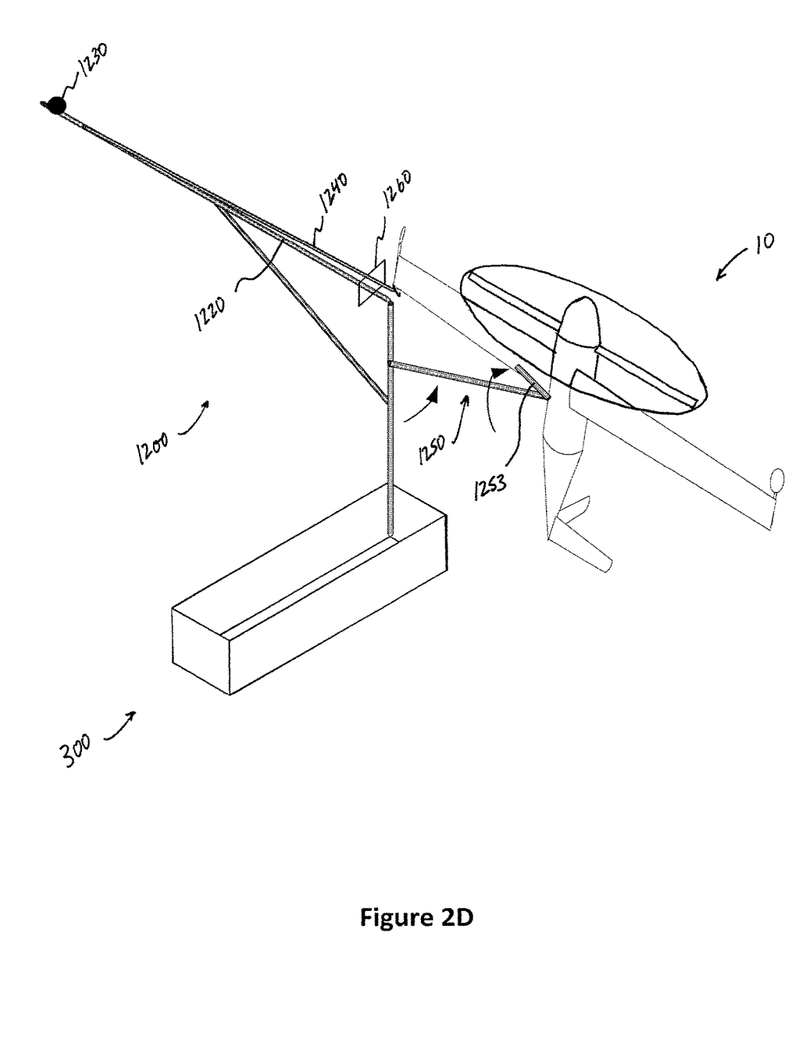
Figure 2E:
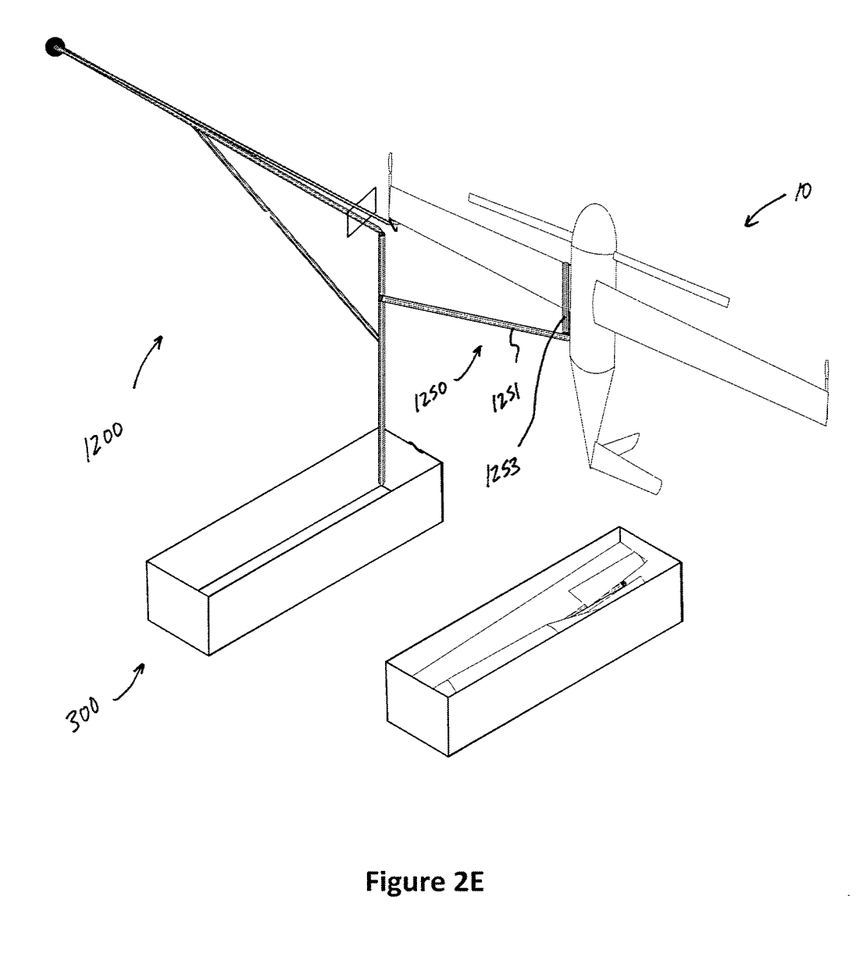

The arm 1251 of the wing restrainer 1250 is rotatable in elevation relative to the base 1210 between a retracted position (shown in FIGS. 2A to 2C and 2G) and a deployed position (shown in FIGS. 2D to 2E). The fingers 1253 and 1255 pivot about the distal end of the arm 1251 between an open position (shown in FIGS. 2A to 2C, 2F, and 2G) and a closed position (shown in FIG. 2E).

The fairlead 1260 is mounted on the translation arm 1220.

Retrieval proceeds as with the first embodiment previously described, until the aircraft 10 is stably tethered downwind of the capture and launch apparatus 200 as shown in FIG. 2B. The capture rod 1240 is then pulled (via the mover (not shown)) "upwind" through the fairlead 1260, which restrains azimuth and elevation of the aircraft 10 with increasing stiffness as translation of the capture rod 1240 continues. As shown in FIGS. 2C to 2E, when the tip of the wing 120 reaches the base post, the wing restrainer 1250 is lifted into contact with the wing/fuselage "armpit," and the fingers 1253 and 1255 then close on the upper and lower surfaces of the wing 120. The aircraft 10 is then supported at the armpit, and fully constrained in translation and rotation.

At this point, the aircraft can be shut down and connected to services. Services such as fuel, electrical power, and engine start can be provided by equipment mounted to the wing restrainer 1250 or by a separate assembly.

Figure 2F:
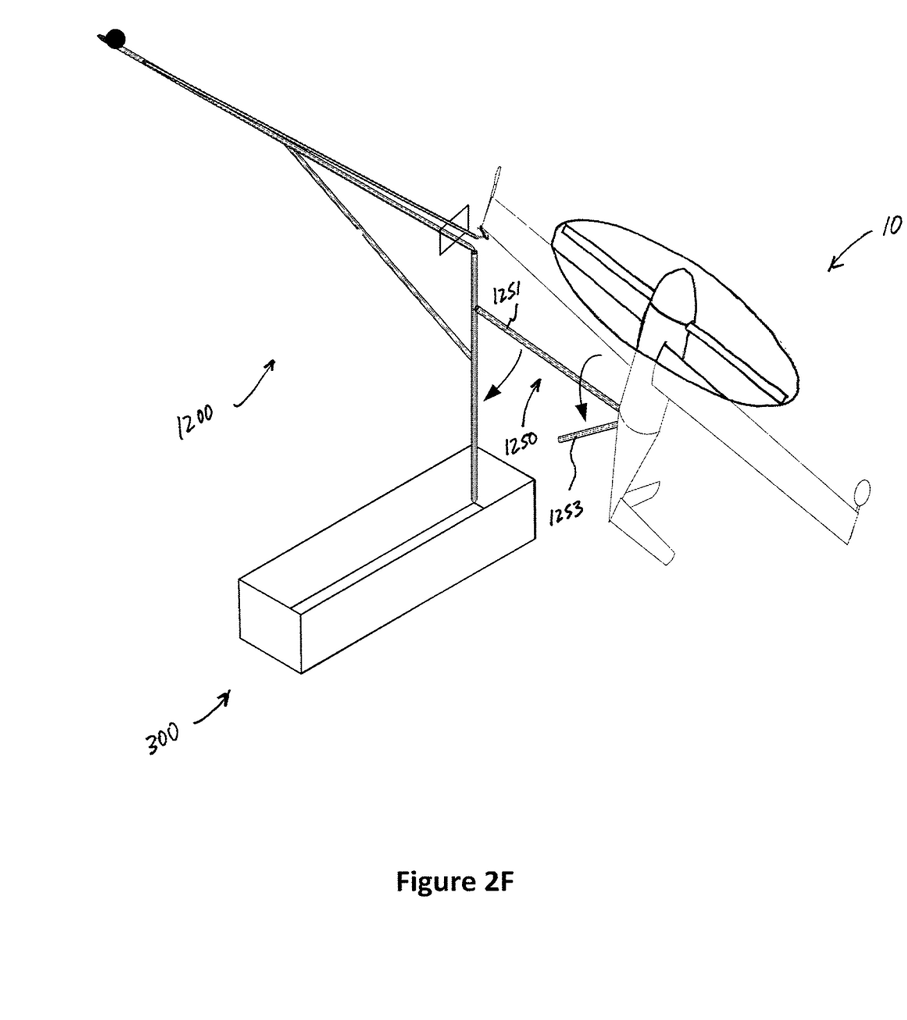
FIG. 2F shows the capture and launch apparatus of FIGS. 2A to 2E while the wing restrainer is releasing the aircraft into stable tethered hover.
Figure 2G:
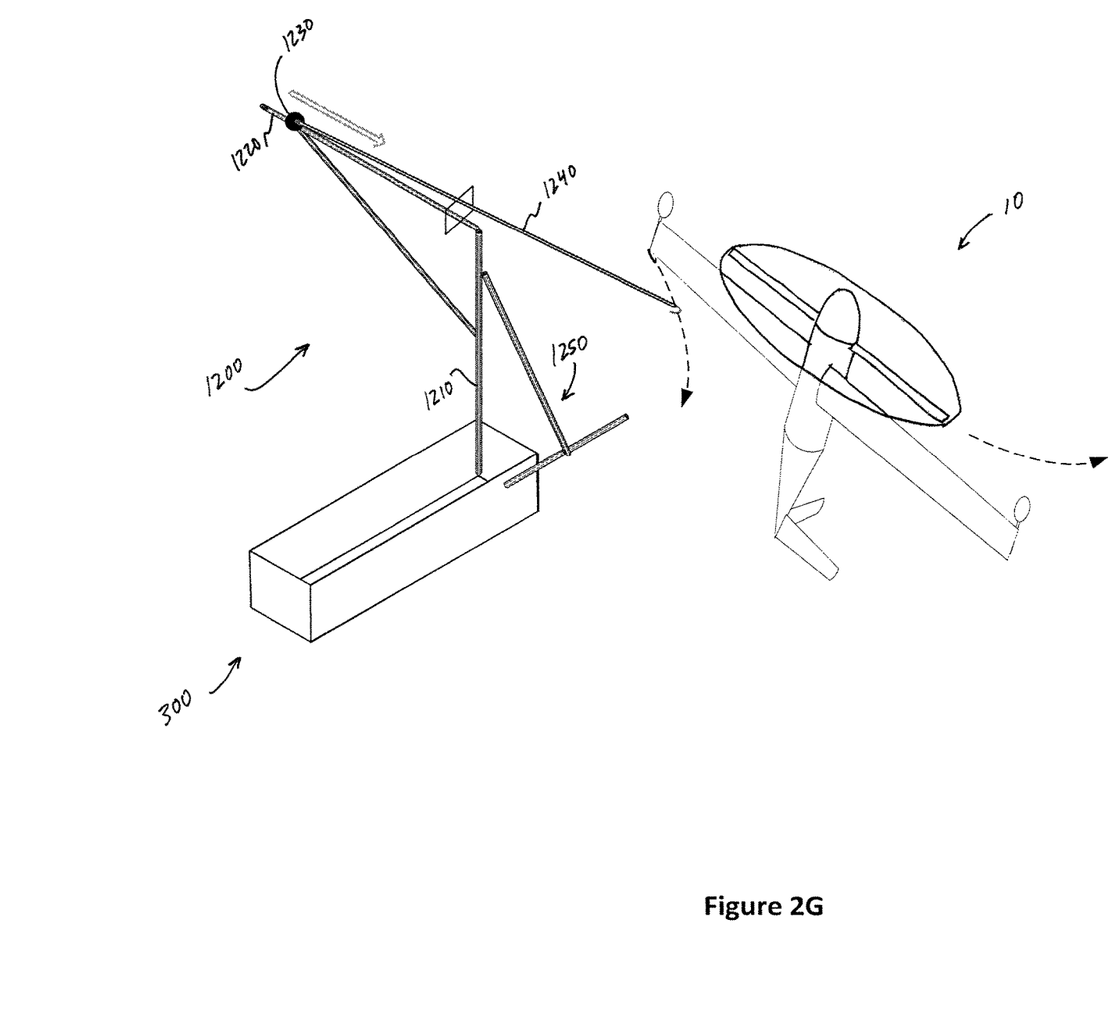
FIG. 2G shows the capture and launch apparatus of FIGS. 2A to 2F releasing the aircraft into free flight.

For launch, the engine of the aircraft 10 is started as in the first embodiment, and the wing restrainer 1250 releases and drops clear of the aircraft 10 as shown in FIG. 2F. Meanwhile, the aircraft 10 lifts in to a stable hover with the capture rod 1240 in tension. As described previously with respect to the first embodiment, power margin for climb can be assessed while tethered, and the aircraft 10 then either recaptured or released. Release is effected as in the first embodiment, by rapidly moving the capture rod 1240 toward the aircraft 10 such that the rod-end capture device 1247 is pushed out of the wingtip capture device 127, as shown in FIG. 2G. The capture-rod 1240 is then rotated clear.

Various changes and modifications to the embodiments described herein will be apparent to those skilled in the art. These changes and modifications can be made without departing from the spirit and scope of the present subject matter and without diminishing its intended advantages. It is therefore intended that such changes and modifications be covered by the appended claims.

The invention is claimed as follows:

1. A method for retrieving an aircraft from free thrust-borne flight, the method comprising:
    (a) elevating a capture rod of a capture apparatus such that the capture rod contacts a fixture of the aircraft extending in a spanwise direction; and
    (b) after a capture device of the aircraft captures the capture rod, moving the capture rod to draw the aircraft toward the capture apparatus; and
    (c) securing the aircraft with the capture apparatus.

2. The method of claim 1, which includes enabling the capture rod and the aircraft to align such that the aircraft maintains a stable hover while attached to the capture rod.

3. The method of claim 1, which includes moving the capture rod along a translation arm of the capture apparatus.

4. The method of claim 1, which includes, before elevating the capture rod, moving the capture rod such that the capture rod is transverse to the translation arm.

5. The method of claim 1, wherein securing the aircraft includes constraining a wing of the aircraft via a wing restrainer of the capture apparatus.

6. The method of claim 5, wherein constraining the wing of the aircraft includes pivoting the wing restrainer to pin the wing between a base of the capture apparatus and the wing restrainer.

7. The method of claim 5, wherein constraining the wing of the aircraft includes pivoting the wing restrainer to contact the aircraft, and manipulating two fingers of the wing restrainer to capture the wing therebetween.

8. The method of claim 1, which includes capturing a fuselage of the aircraft using a fuselage capturer of the capture apparatus.

9. The method of claim 1, which includes servicing the aircraft after securing the aircraft by at least one of: starting an engine of the aircraft, fueling the aircraft, and connecting the aircraft to an electrical supply.

10. The method of claim 1, which is performed automatically.

* * * * *